(12) United States Patent
Kleinmann et al.

(10) Patent No.: US 7,143,548 B2
(45) Date of Patent: Dec. 5, 2006

(54) DRIVE FOR OPENING AND CLOSING A VEHICLE FLAP

(75) Inventors: Michael Kleinmann, Melsbach (DE); Andreas Ritter, Hilgert (DE)

(73) Assignee: Stabilus GmbH, Koblenz (DE)

( * ) Notice: Subject to any disclaimer, the term of this patent is extended or adjusted under 35 U.S.C. 154(b) by 405 days.

(21) Appl. No.: 10/839,080

(22) Filed: May 5, 2004

(65) Prior Publication Data

US 2005/0160673 A1 Jul. 28, 2005

(30) Foreign Application Priority Data

May 5, 2003 (DE) ................. 103 20 098

(51) Int. Cl.
*E05F 11/28* (2006.01)
*E05F 11/00* (2006.01)
*E05D 15/40* (2006.01)

(52) U.S. Cl. ............... 49/345; 49/340; 49/336; 49/248; 296/146.8; 296/56

(58) Field of Classification Search ........... 49/334, 49/340, 338, 336, 339, 324, 248, 246, 345, 49/26; 296/146.8, 50, 51, 52, 53, 55, 56, 296/106, 146.12, 146.11; 248/276.1, 287.1, 248/285.1, 274.1, 281.1, 299.1
See application file for complete search history.

(56) References Cited

U.S. PATENT DOCUMENTS

| | | | |
|---|---|---|---|
| 3,332,169 A * | 7/1967 | Lohr et al. ............. | 49/340 |
| 3,713,472 A * | 1/1973 | Dozois ................. | 49/340 |
| 3,716,945 A * | 2/1973 | Cooper et al. .......... | 49/340 |
| 4,141,582 A * | 2/1979 | Streeter ............... | 296/50 |
| 4,165,897 A * | 8/1979 | Schmidt ............... | 296/56 |
| 4,341,413 A * | 7/1982 | Woods ................ | 296/50 |
| 4,625,455 A * | 12/1986 | Harris et al. ........... | 49/281 |
| 4,655,144 A * | 4/1987 | Frech et al. ............ | 49/340 |
| 4,679,841 A * | 7/1987 | Taunay ............. | 296/146.8 |
| 4,818,009 A * | 4/1989 | Muscat .............. | 296/106 |
| 4,838,111 A * | 6/1989 | Schmidt ............... | 49/248 |
| 6,196,618 B1* | 3/2001 | Pietryga et al. ...... | 296/146.11 |
| 6,250,707 B1* | 6/2001 | Dintner et al. .......... | 296/76 |
| 6,341,809 B1* | 1/2002 | Chapman .............. | 296/56 |
| 6,401,392 B1* | 6/2002 | Yuge ................. | 49/340 |
| 6,471,284 B1* | 10/2002 | Landmesser ......... | 296/146.8 |
| 6,578,899 B1* | 6/2003 | Hasselgruber et al. . | 296/146.11 |
| 6,644,707 B1* | 11/2003 | McLaughlin et al. ... | 296/146.8 |

(Continued)

FOREIGN PATENT DOCUMENTS

DE 199 35 344 A1 2/2001
GB 872577 7/1961

*Primary Examiner*—Hugh B. Thompson, II
(74) *Attorney, Agent, or Firm*—Cohen, Pontani, Lieberman & Pavane

(57) ABSTRACT

A flap drive for a flap includes two identical lever joint arrangements which are arranged in pairs at a distance from one another. The flap can be moved out of its closing position into its opening position and back by the flap drive. In this case, the lever joint arrangements are articulated pivotably with one of their ends in each case on a side region of the flap and with their other ends at a fixed location on the motor vehicle. The mutually corresponding pivot axes of the articulation points extend coaxially to one another. Movement transmission devices for the pivotable drive of a driven lever of each lever joint arrangement are guided by a common motive drive unit, the driven levers being articulated at a fixed location on the motor vehicle.

30 Claims, 15 Drawing Sheets

U.S. PATENT DOCUMENTS

| | | | |
|---|---|---|---|
| 6,719,357 B1 * | 4/2004 | Pfertner et al. | 296/146.8 |
| 6,789,834 B1 * | 9/2004 | Schlegel | 296/146.8 |
| 6,793,268 B1 * | 9/2004 | Faubert et al. | 296/146.12 |
| 6,871,449 B1 * | 3/2005 | Ihashi | 49/339 |
| 6,955,390 B1 * | 10/2005 | Rigorth et al. | 296/146.8 |
| 6,991,273 B1 * | 1/2006 | Kim | 296/146.8 |
| 7,014,248 B1 * | 3/2006 | Yokota et al. | 296/146.8 |
| 7,040,687 B1 * | 5/2006 | Ishibashi et al. | 296/146.12 |
| 7,063,373 B1 * | 6/2006 | Chikata et al. | 296/56 |
| 7,069,695 B1 * | 7/2006 | Hattori et al. | 49/341 |
| 7,083,216 B1 * | 8/2006 | Hahn | 296/146.8 |
| 7,083,217 B1 * | 8/2006 | Fukumoto et al. | 49/340 |

* cited by examiner

DRIVE FOR OPENING AND CLOSING A VEHICLE FLAP

BACKGROUND OF THE INVENTION

1. Field of the Invention

The invention relates to a drive for moving a flap, in particular for the rear flap or tailgate of a motor vehicle, out of its closing position into its opening position and back, the drive having two identical lever joint arrangements which are arranged in pairs at a distance from one another, one end of the lever joint arrangements being articulated pivotably on a side region of the lever joint arrangements proximate the flap and an other end of the lever joint arrangements being articulated pivotably at a fixed location on the motor vehicle or a component of the motor vehicle, the mutually corresponding pivot axes of the articulation points extending coaxially to one another.

2. Description of the Related Art

In flap drives for opening a rear flap on a motor vehicle, lever joint arrangements comprising parallelogram lever joint arrangements are used to move a rear flap out of a vertically oriented closing position of approximately vertical attitude in an arc into a likewise vertically oriented opening position. For this purpose, the two lever joint arrangements are driven by two separate drive units. As a result of the two drive units, the flap drive is complicated and requires a large amount of construction space.

Furthermore, the use of the two separate drive units easily leads to an unequal drive and consequently to an asymmetric application of torque on the two sides of the flap, such that distortions of the flap may occur during the movement drive.

SUMMARY OF THE INVENTION

An object of the present invention is to provide a flap drive for a rear flap, i.e., tailgate or hatch, of a motor vehicle, which requires a low outlay in structural terms and a small amount of construction space and by which avoids distortions of the flap during the movement drive of the rear flap.

The object is achieved, according to the present invention, by movement transmission means arranged at each lever joint for the pivotable drive of a lever of each lever joint arrangement, the driven lever being articulated at a fixed location on the motor vehicle or a component of the motor vehicle, wherein the movement transmission means at each lever joint are guided by a common motive, in particular, an electromotive drive unit.

This design allows the drive to apply torque symmetrically on both sides of the flap during the movement travel of the flap, so that a distortion of the flap during movement is avoided.

The one drive unit requires only a small amount of construction space and a low outlay in structural terms.

The levers articulated at a fixed location on the motor vehicle or a component of the motor vehicle may be pivotable out of their closing position into their opening position through various angles, but, in particular, through approximately 180°. A wide range of movement of the flap out of its closing position into its opening position is consequently achieved.

A stable hold of the flap is achieved when the lever joint arrangements are four-bar lever arrangements.

If the four-bar lever arrangements are at least approximately parallelogram lever arrangements, a flap movement with an at least largely identical orientation of a plane of the flap during the entire movement travel takes place. The necessary space through which the flap is moved is consequently also particularly small.

A particularly simple motive drive unit consists of a rotary drive.

The construction of the inventive drive may be realized in a particularly simple manner when a rigid drive shaft can be driven rotatably by a rotary drive, wherein the rigid drive shaft extends coaxially to one of the pivot axes of the fixed-location articulation points on the motor vehicle or a component of the motor vehicle and the rigid drive shaft is connected fixedly in terms of rotation in each case to one of the mutually corresponding levers of the lever joint arrangements.

So that the torque to be applied by the rotary drive can be reduced and/or so that the rotary drive can be arranged at a point further from the flap, a rigid drive shaft can be driven rotatably by the rotary drive, wherein the rigid drive shaft extends parallel to one of the pivot axes of the fixed-location articulation points on the motor vehicle or a component of the motor vehicle and the rigid drive shaft is connected via gear units in each case to one of the mutually corresponding levers of the lever joint arrangement, these levers being capable of being driven pivotably about the pivot axis by the gear units.

The gear units may be chain gear units or toothed-belt gear units which have a driving wheel arranged fixedly on the drive shaft and a drive wheel arranged fixedly in terms of rotation on the lever, a chain or a toothed belt being guided around the driving wheel and drive wheel.

In a further embodiment, flexible shafts may be driven rotatably by the rotary drive. Each of the flexible shafts extend to one of the pivot axes of the fixed-location articulation points on the motor vehicle or a component of the motor vehicle and by means of which in each case one lever of the lever joint arrangement can be driven rotatably.

This embodiment allows, with high degrees of freedom, the arrangement of the drive unit at a distant point.

To reduce the torque to be applied by the drive unit, each flexible shaft is capable of driving rotatably the lever assigned to it by one or more gear units.

The required torque to be applied is in this case is particularly low when the gear unit is an epicyclic gear unit or a worm gear unit.

In a further embodiment, the motive drive unit may be a rope-traction drive. In this embodiment, two ropes leading to and wound onto rope pulleys can be driven tractively. The rope pulleys are arranged in each case coaxially to one of the pivot axes of the fixed-location articulation points on the motor vehicle or a component of the motor vehicle and are connected fixedly in terms of rotation in each case to one of the mutually corresponding levers of the lever joint arrangements.

This embodiment, too, makes it possible, with high degrees of freedom, to arrange the drive unit at a point distant from the flap to be driven.

One or two driving rope pulleys, onto which one or two of the ropes can be wound, may be capable of being driven rotatably by means of the rope-traction drive.

Alternatively, one or two racks, to which one or two of the ropes are fastened tractively, may be driven movably in their longitudinal direction by the rope-traction drive.

If in each case two ropes are guided from the driving rope pulley or the rack to a rope pulley and can be wound in the opposite direction onto the driving rope pulley or can be tractioned from the rack and can be wound in the opposite direction onto the rope pulley and unwound, then the flap drive can execute not only an opening movement of the flap, but also a closing movement. For this purpose, it is necessary merely for a reversal of the direction of movement of the rope pulley or of the rack to take place.

To reduce the torque to be applied by the motive drive unit, the driving rope pulley or the rack may be capable of being driven by the motive drive unit via a gear unit, in particular a reduction gear unit.

In a further embodiment, a lever of each lever joint arrangement, which is articulated at a fixed location on the motor vehicle or a component of the motor vehicle, may have a first auxiliary lever which is articulated with one end region on the lever at a distance from a connecting line between the fixed-location articulation point of the lever on the motor vehicle or a component of the motor vehicle and the articulation point of the lever on the flap, so that the first auxiliary lever is pivotable about a first joint axis parallel to the pivot axes of the lever. The first auxiliary lever is, in the region of the connecting line, capable of butting against a first abutment at a distance from the fixed-location articulation point. At its other end region, the first auxiliary lever can be acted upon with force by a first movement means approximately in the direction of extent of the lever in one of the closing position or the opening position.

The arrangement of the first auxiliary lever avoids a dead center position of the drive, which would otherwise occur in the case of large opening angles of the levers. Furthermore, the torque acting upon the lever can be kept largely constant.

To allow a movement drive in both directions of movement, the lever articulated at a fixed location on the motor vehicle or a component of the motor vehicle may have a second auxiliary lever which is articulated with one end region on the lever at a distance from the connecting line between the fixed-location articulation point of the lever on the motor vehicle or a component of the motor vehicle and the articulation point of the lever on the flap on that side of the connecting line which is located opposite the first joint axis, so as to be pivotable about a second joint axis parallel to the pivot axes of the lever. The second auxiliary lever is, in the region of the connecting line, capable of butting against a second abutment at a distance from the fixed-location articulation point. At its other end region, the second auxiliary lever can be acted upon with force by second movement means approximately in the direction of extent of the lever in the other of the closing position or the opening position.

In this case, a flat construction of the flap drive which saves construction space is achieved when the first auxiliary lever and the second auxiliary lever are arranged on sides of the lever which are located opposite to one another.

The first and second auxiliary lever may have different lengths.

If the first and second abutment are arranged approximately coaxially to one another and the first and the second auxiliary lever are approximately of equal length, then identical kinematic conditions can be achieved both for the opening operation and for the closing operation, along with a small overall size.

The first and/or the second movement means may be ropes of a rope-traction device and/or pneumatic springs.

Where pneumatic springs are concerned, these are also at the same time the drive unit. In this case, each lever joint arrangement may also be assigned a pneumatic spring.

To prevent an obstacle located in the path of movement of the flap from being pinched and damaged, a resistance obstructing a pivoting movement of the lever arrangement may be capable of being detected and a corresponding resistance signal can be capable of being fed to electronics by an obstacle recognition. In response to a resistance signal, the drive unit may be stopped in the one drive direction.

So that an obstacle of this kind may be released again immediately, the drive unit can be capable of being changed over, so as to move over a defined distance opposite to the one drive direction, by means of the electronics when a resistance signal is received.

For this purpose, the obstacle recognition may have a position sensor, in particular a potentiometer, which detects the respective position of one of the levers of the lever arrangement and by means of which a corresponding position signal can be generated and can be fed to the electronics, and, in the electronics, the running time actually required to reach the respective position can be compared with a defined predetermined running time for reaching the respective position, in which case, when the actual running time overshoots the predetermined running time, the resistance signal can be generated.

The detection of the position of one of the levers of the lever arrangement may also take place indirectly, in that, for example, the position of the drive unit is detected by a sensor, such as, for example, a Hall sensor. For this purpose, the sensor may be integrated into the drive unit.

When a movement of the flap is not effected by the motive drive unit, but by the action of manual force, it is advantageous if a coupling, which can be opened when the flap is acted upon manually to move to move the flap, is arranged between the motive drive unit and the movement transmission means or between the movement transmission means and that lever of the lever joint arrangement which is capable of being driven pivotably by them.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawing, wherein like reference characters denote similar elements throughout the several views.

DETAILED DESCRIPTION OF THE PRESENTLY PREFERRED EMBODIMENTS

Figure 1:
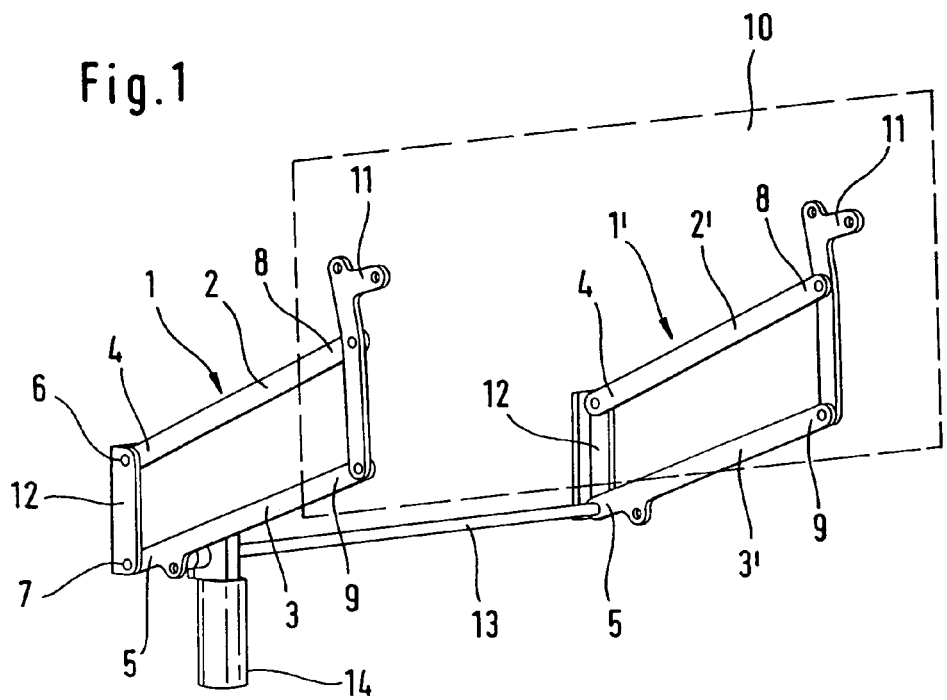
FIG. 1 a diagrammatic perspective illustration of a first embodiment of a flap drive according to the present invention.

The flap drives illustrated in the Figs. have two identical parallelogram lever arrangements 1 and 1' arranged in pairs at a distance from and parallel to one another. Each of the parallelogram lever arrangements 1, 1' includes two mutually parallel levers 2, 3 and 2', 3', respectively. The parallel levers 2 and 2' have an end 4 and the parallel levers 3, 3' have an end 5 that are articulated pivotably at a fixed location on a motor vehicle by a body lever 12, the corresponding pivot axes 6 and 7 of the articulation points extending coaxially to one another. Lever 2 is fixed at an approximately vertical distance from lever 3 and lever 2' is fixed at an approximately vertical distance from lever 3'.

The two other ends 8 and 9 of the levers 2, 3 and 2', 3' are articulated on a flap lever 11 fixedly connected to a flap 10 (illustrated by broken lines in FIG. 1).

In the exemplary embodiment of FIG. 1, a rigid drive shaft 13, which is connected fixedly in terms of rotation to the levers 3 and 3', extends coaxially to the pivot axis 7. An electromotive rotary drive 14 operates to rotate the drive shaft 13. The levers 3 and 3' are driven pivotably with the drive shaft 13 through about 180°. Due to the pivoting of the levers 3 and 3', the two parallelogram lever arrangements 1 and 1' are pivoted and, thus, the flap 10, while maintaining its vertically oriented plane, moves in an arc out of a lower closing position into an upper opening position and, with the rotary drive being reversible, also back again.

To assist the opening movement, the levers 3 and 3' or 2 and 2' may be acted upon in the direction of the opening position by pneumatic springs, not illustrated in FIG. 1.

For the manual movement of the flap 10 from the closing position to the opening position, or vice-versa, a coupling may be arranged between the rotary drive 14 and the drive shaft 13 which is opened when the flap 10 is moved manually and which thus separates the frictional connection between the rotary drive 14 and drive shaft 13.

Figure 2:
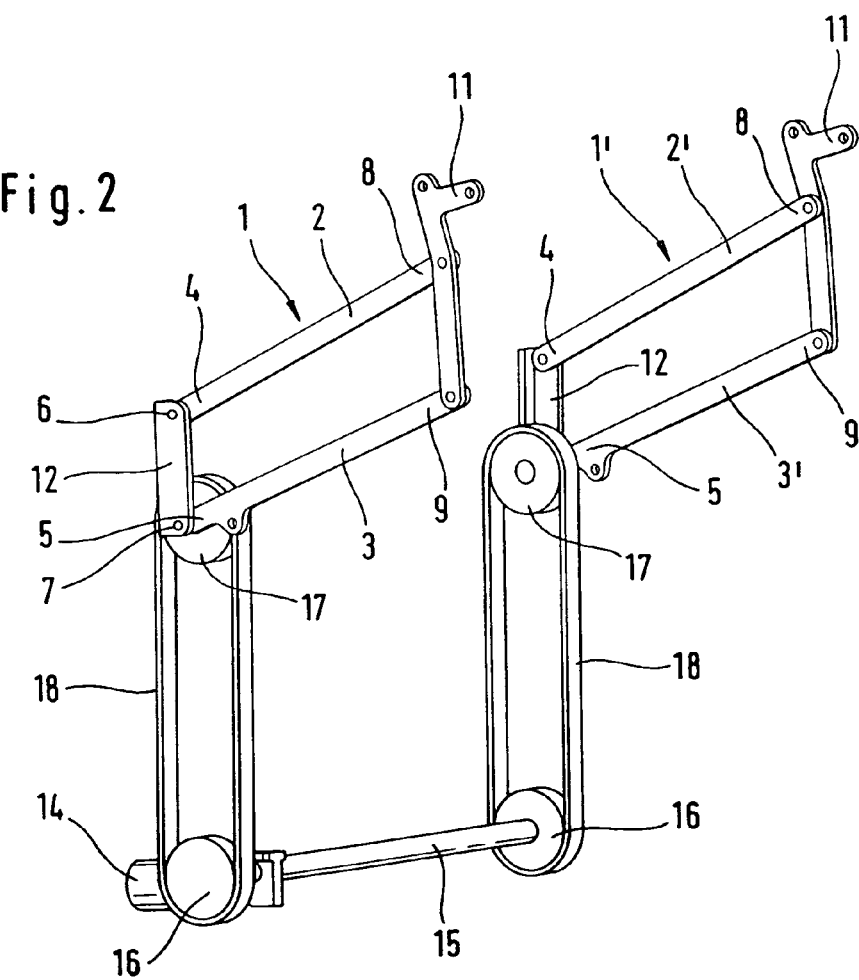
FIG. 2 is a diagrammatic perspective illustration of a second embodiment of a flap drive according to the present invention.

In the exemplary embodiment of FIG. 2, there extends parallel to the pivot axes 6 and 7 a rigid drive shaft 15 which carries rotationally fixed toothed-belt pulleys 16 and which can be driven rotatably by means of a rotary drive 14 via the coupling between the rotary drive 14 and the drive shaft 15.

Further toothed-belt pulleys 17 are connected fixedly in terms of rotation to the levers 3 and 3' coaxially to the pivot axis 7 in the plane of the toothed-belt pulleys 16 so as to be located opposite these in parallel.

Around the toothed-belt pulleys 16 and 17 located opposite one another are guided toothed belts 18 which transmit the rotational movement of the drive shaft 15 to the toothed belt pulleys 17 and drive the levers 3 and 3' and consequently the parallelogram lever arrangements 1, 1' pivotably, so that the flap 10 can be moved between its closing position and its opening position.

Figure 3:
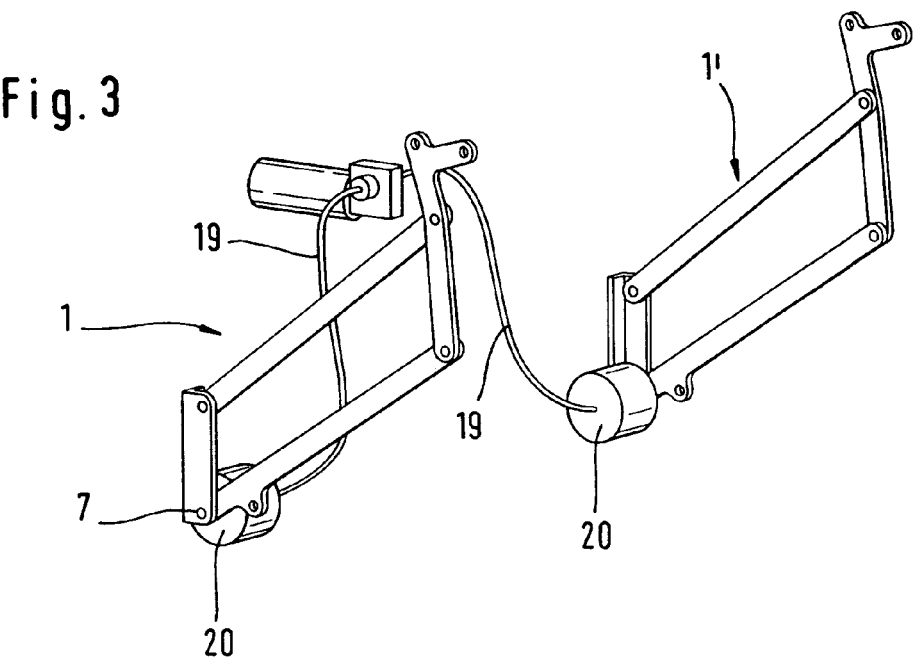
FIG. 3 is a diagrammatic perspective illustration of a third embodiment of a flap drive according to the present invention.

In FIG. 3, two flexible shafts 19 can be driven rotatably for the pivoting drive of the parallelogram lever arrangements 1 and 1' by the rotary drive 14. Each of the flexible shafts 19 extends to one of the levers 3 and 3' and which drive these pivotably about the pivot axis 7 via epicyclic gear units 20.

Figure 4:
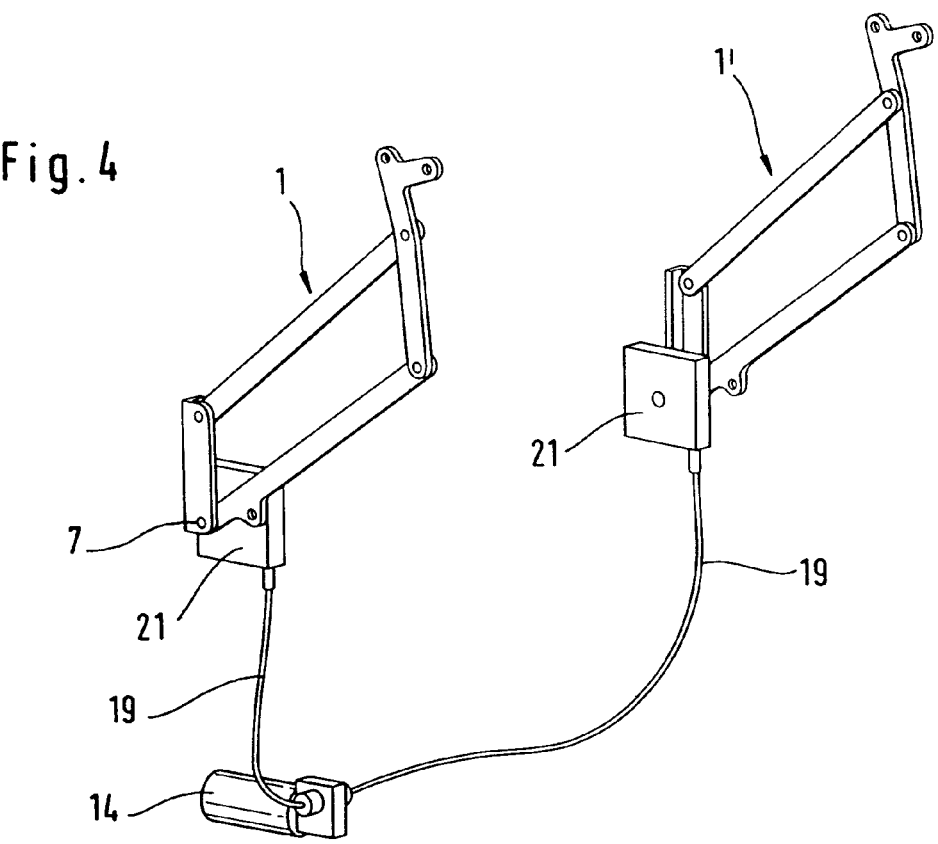
FIG. 4 is a diagrammatic perspective illustration of a fourth embodiment of a flap drive according to the present invention.

Instead of the epicyclic gear units 20, FIG. 4 shows that the levers 3 and 3' are driven pivotably about the pivot axis 7 by two flexible shafts 19 via worm gear units 21.

Figure 5:
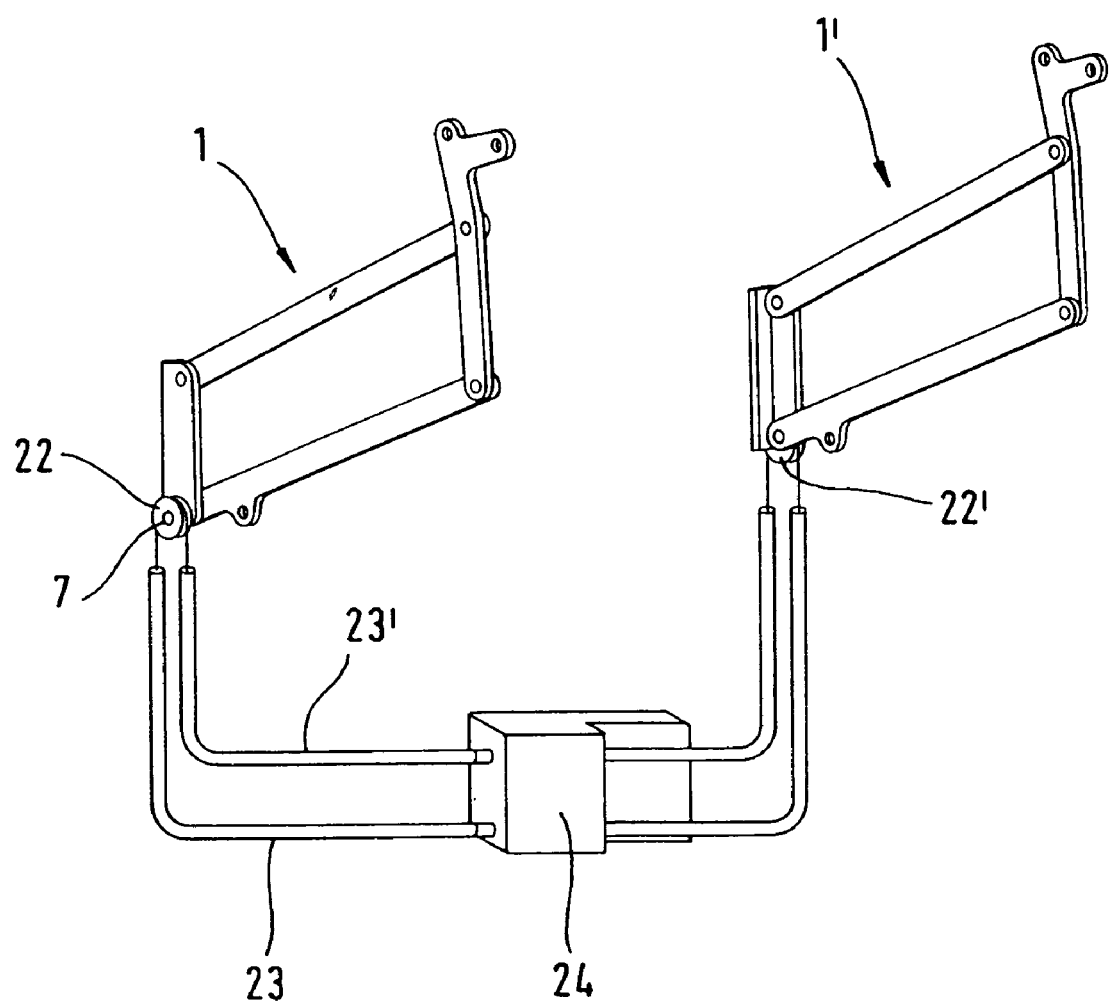
FIG. 5 is a diagrammatic perspective illustration of a fifth embodiment of a flap drive according to the present invention.

In the exemplary embodiment of FIG. 5, rope pulleys 22 and 22' are arranged fixedly in terms of rotation on the levers 3 and 3' coaxially to the pivot axis 7. Ropes 23 and 23' are guided around the rope pulleys 22 and 22'. The ropes 23, 23' can be driven tractively by a reversible electromotive rope-traction drive 24. As a result of the tractive movement, the ropes 23 and 23' drive the rope pulleys 22 and 22' rotatably and thus pivot the levers 3 and 3' and consequently the parallelogram lever arrangements 1 and 1'.

Figure 6:
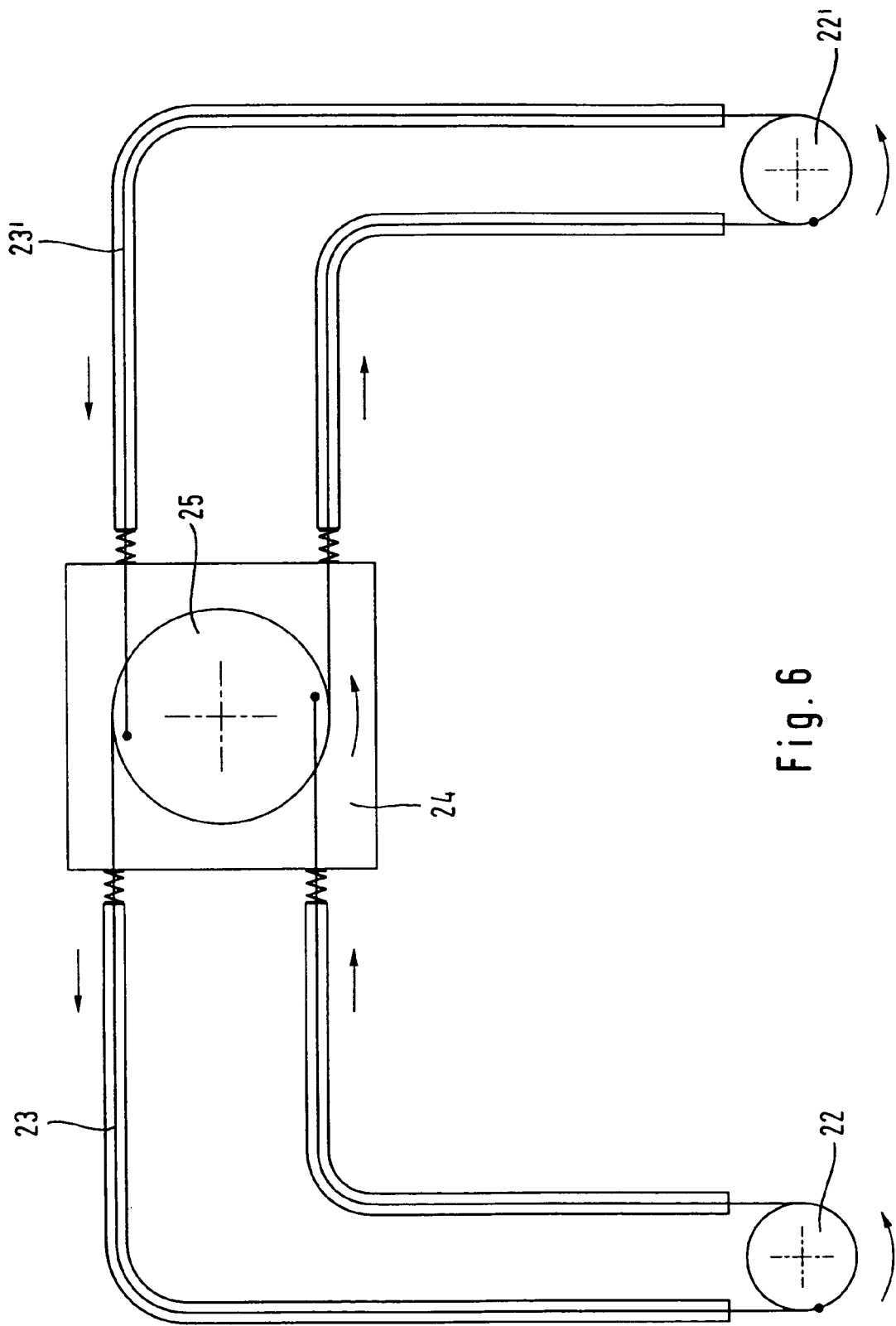
FIG. 6 is a schematic view of a rope-traction drive of the flap drive according to FIG. 5.

As illustrated in FIG. 6, the rope-traction drive 24 possesses a driving rope pulley 25 which can be rotatably driven reversibly by a rotary drive, not illustrated. As a result, the ropes 23 and 23' can be wound onto the driving pulley 25 and unwound and the ropes 23 and 23' can thus be driven tractively.

Figure 7:
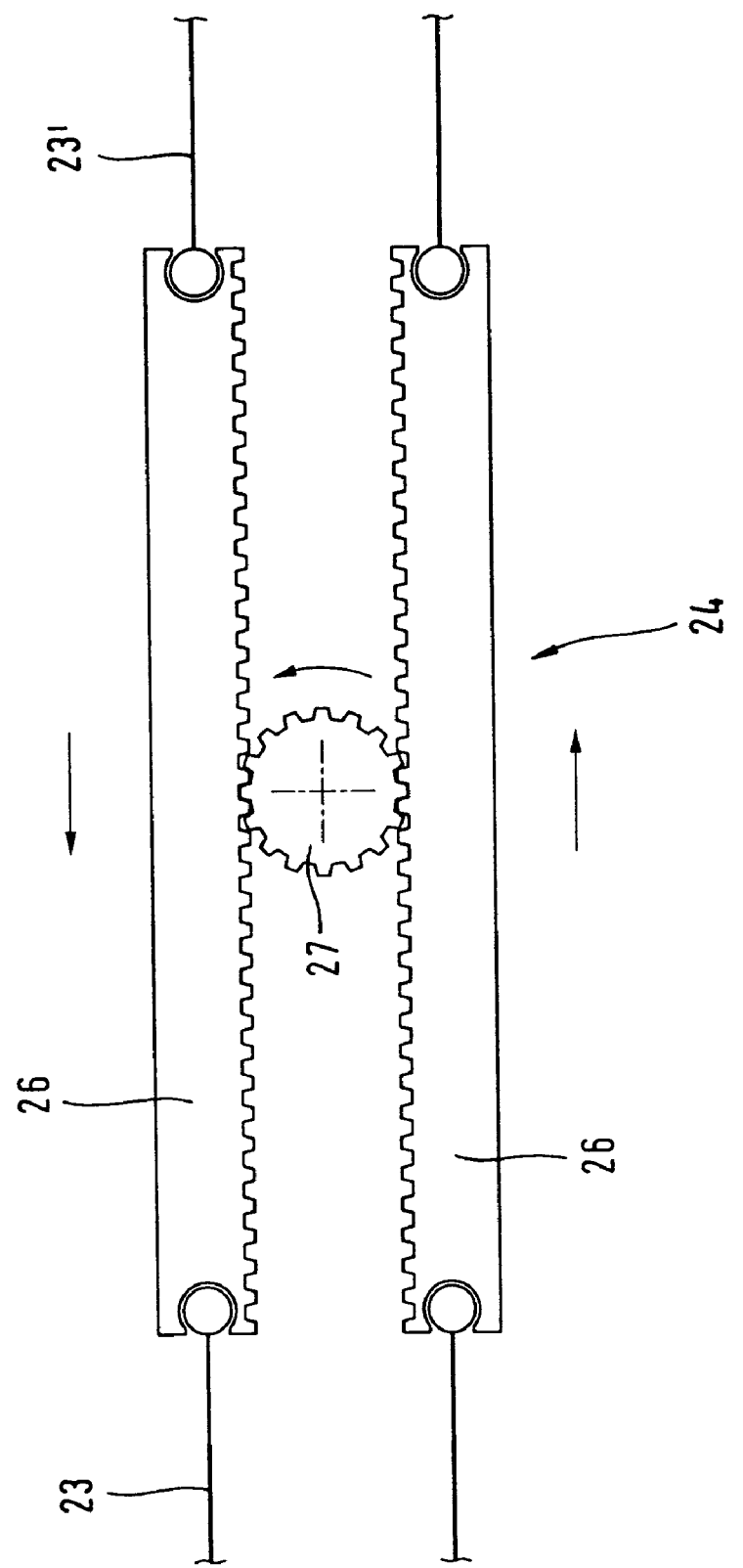
FIG. 7 is a further rope-traction drive for use in the flap drive according to FIG. 5.

Alternatively to the rope pulleys 22 and 22', according to FIG. 7, two racks 26 and 26' having mutually facing toothings, can be arranged parallel to one another that are capable of being driven movably in their longitudinal extent in opposite directions by a driving wheel 27 engaging into the toothings of the two racks 26 and capable of being driven reversibly by a rotary drive.

In the exemplary embodiment of FIGS. 8 to 16, in which only one parallelogram lever arrangement 1 is illustrated, a first auxiliary lever 28 is articulated with one end on the lever 3 in the region of the end 5 of the latter so as to be pivotable about a first joint axis 29 parallel to the pivot axis 7. The first joint axis 29 is located at a distance from a connecting line 30 between the pivot axis 7 and the articulation point of the lever 3 on the flap 10.

A first abutment 31 is arranged on the lever 3 and projects into the pivoting range of the first auxiliary lever 28, approximately on the connecting line 30 and approximately at the same height as the first joint axis 29. The free end of the first auxiliary lever 28 has articulated on it, at an articulation point 34, one end of a pneumatic spring 32. A piston rod 33 which projects out of the other end of the pneumatic spring is articulated with its free end on a fixed-location component of the motor vehicle. The distance between the first joint axis 29 and the articulation point 34 is approximately twice as great as the distance between the connecting line 30 and the first joint axis 29.

Figure 8:
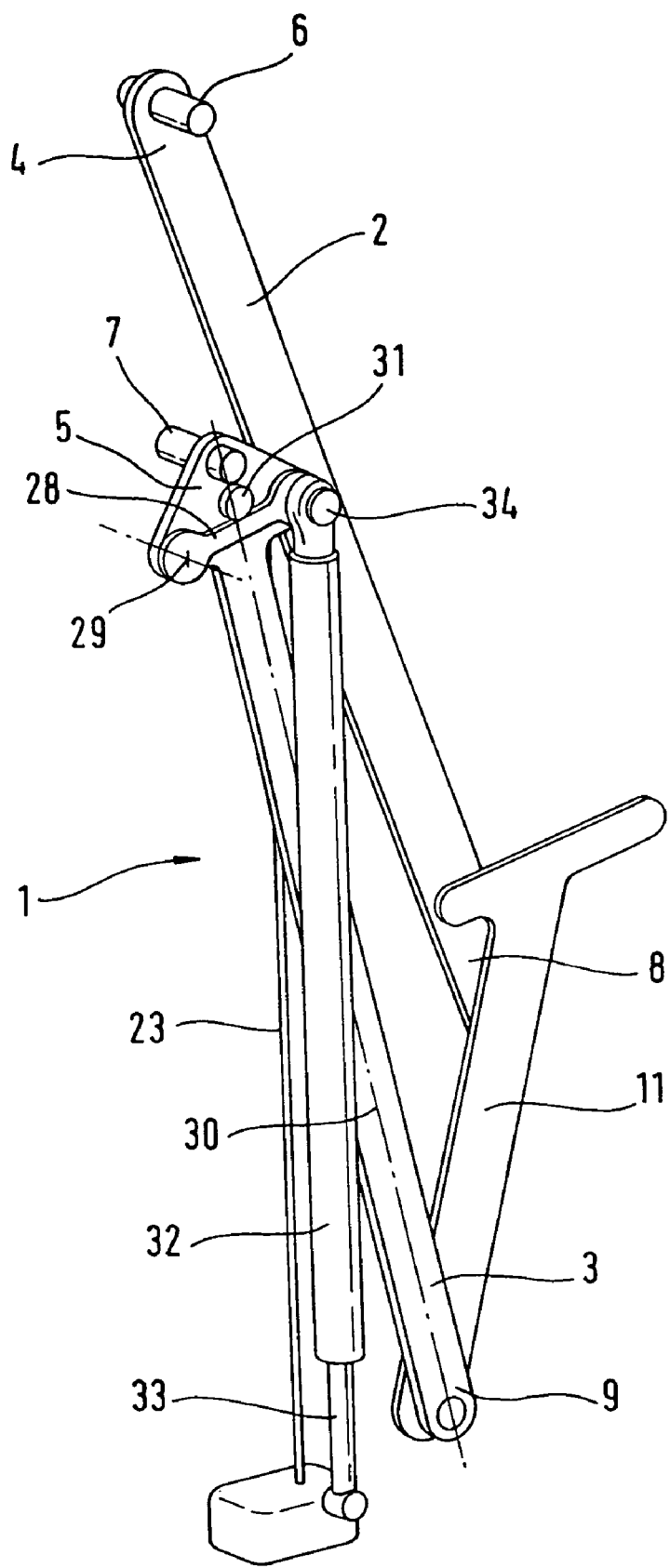
FIG. 8 is a perspective view of one of the lever joint arrangements of the flap drive according to FIG. 5 in the closing position.

The closing position of the flap drive is illustrated in FIG. 8. As a result of the opening of a flap lock, not illustrated, by means of which the flap 10 is held in the closing position on the body of the motor vehicle, the pneumatic spring 32, in its extension direction, acts upon the first auxiliary lever 28 at the articulation point 34. In this case, the first auxiliary lever 28 is supported with its middle region on the first abutment 31, so that a torque is exerted on the first auxiliary lever 28 by the pneumatic spring 32. This torque produces a pivoting of the first auxiliary lever 28 anti-clockwise around the first abutment 31, with the result that the lever 3 is also driven to pivot anti-clockwise via the first joint axis 29.

Figure 9:
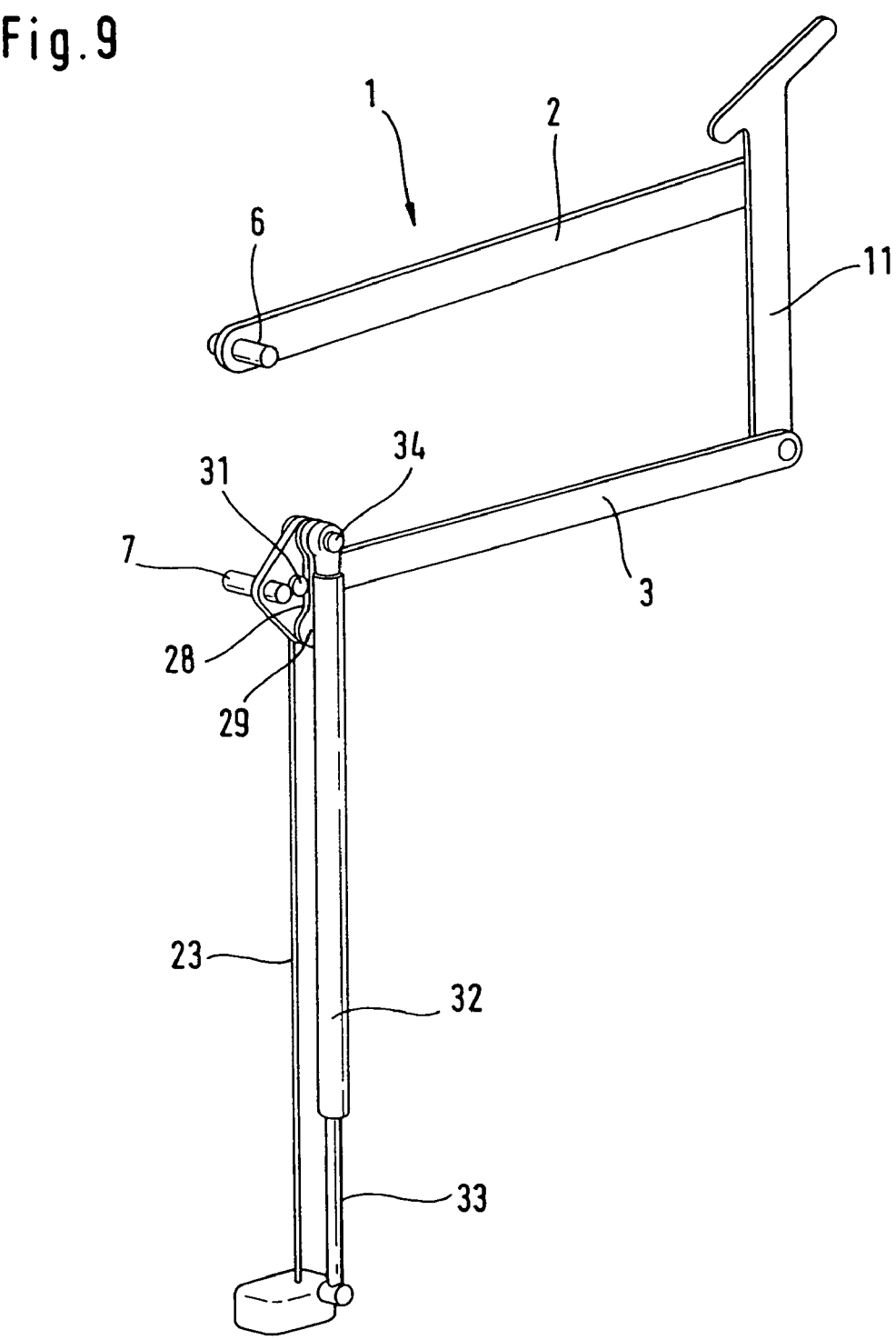
FIG. 9 is the lever joint arrangement according to FIG. 8 in a middle opening position.
Figure 10:
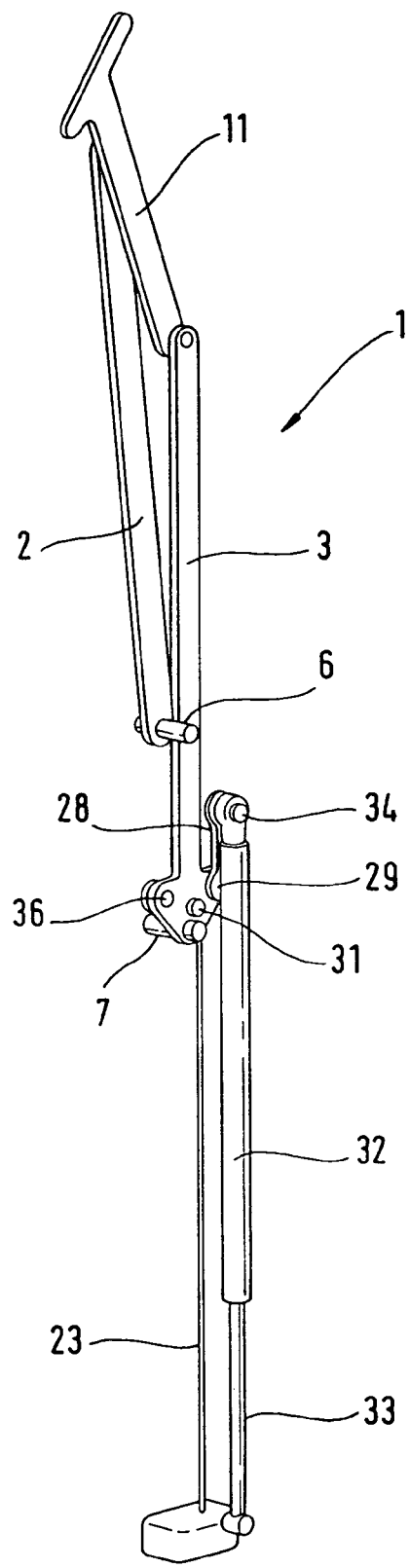
FIG. 10 is the lever joint arrangement according to FIG. 8 in the full opening position.
Figure 11:
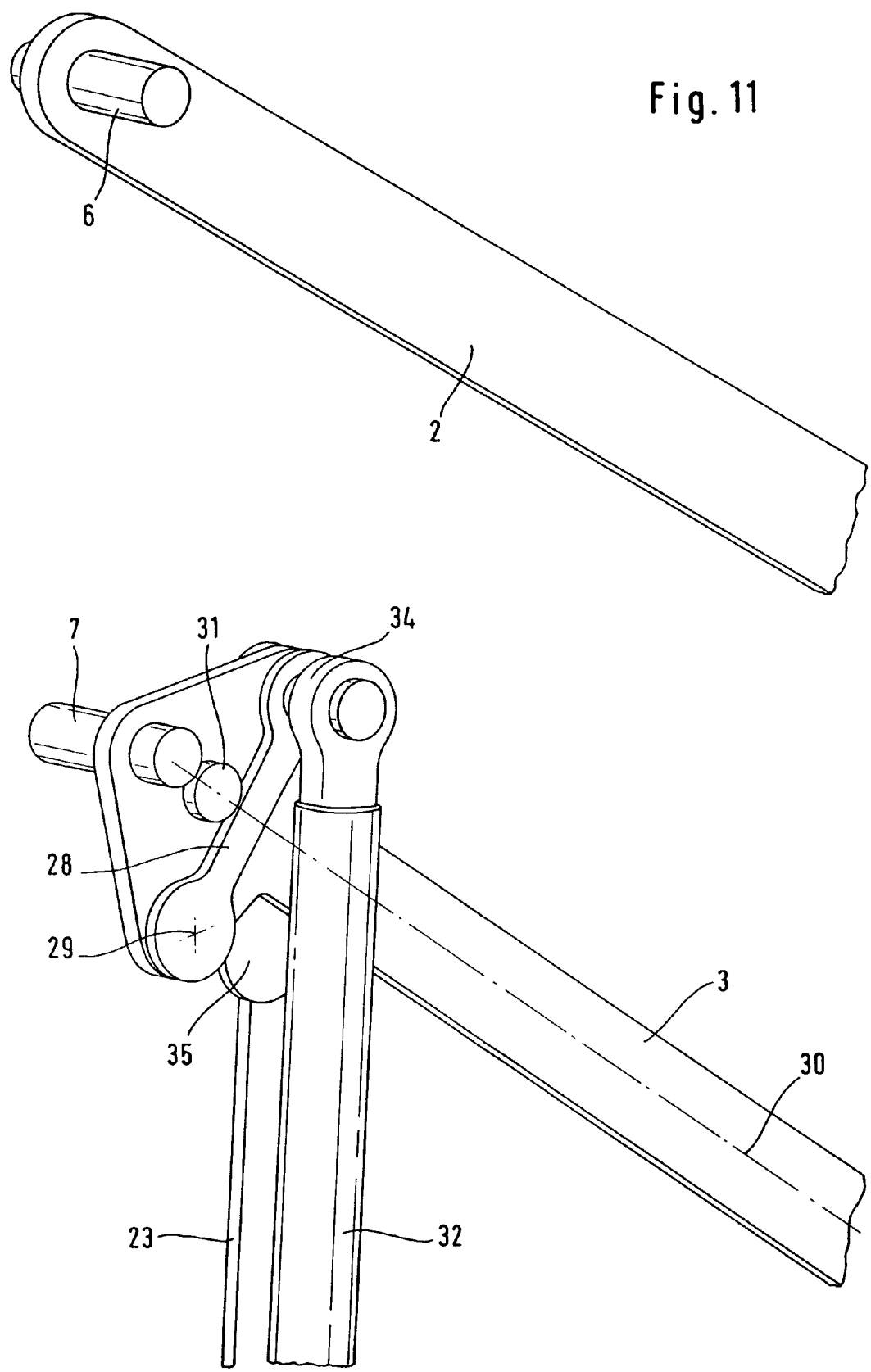
FIG. 11 is an enlarged perspective view of a detail of the lever joint arrangement according to FIG. 8 in a position between the closing position and the middle opening position.
Figure 12:
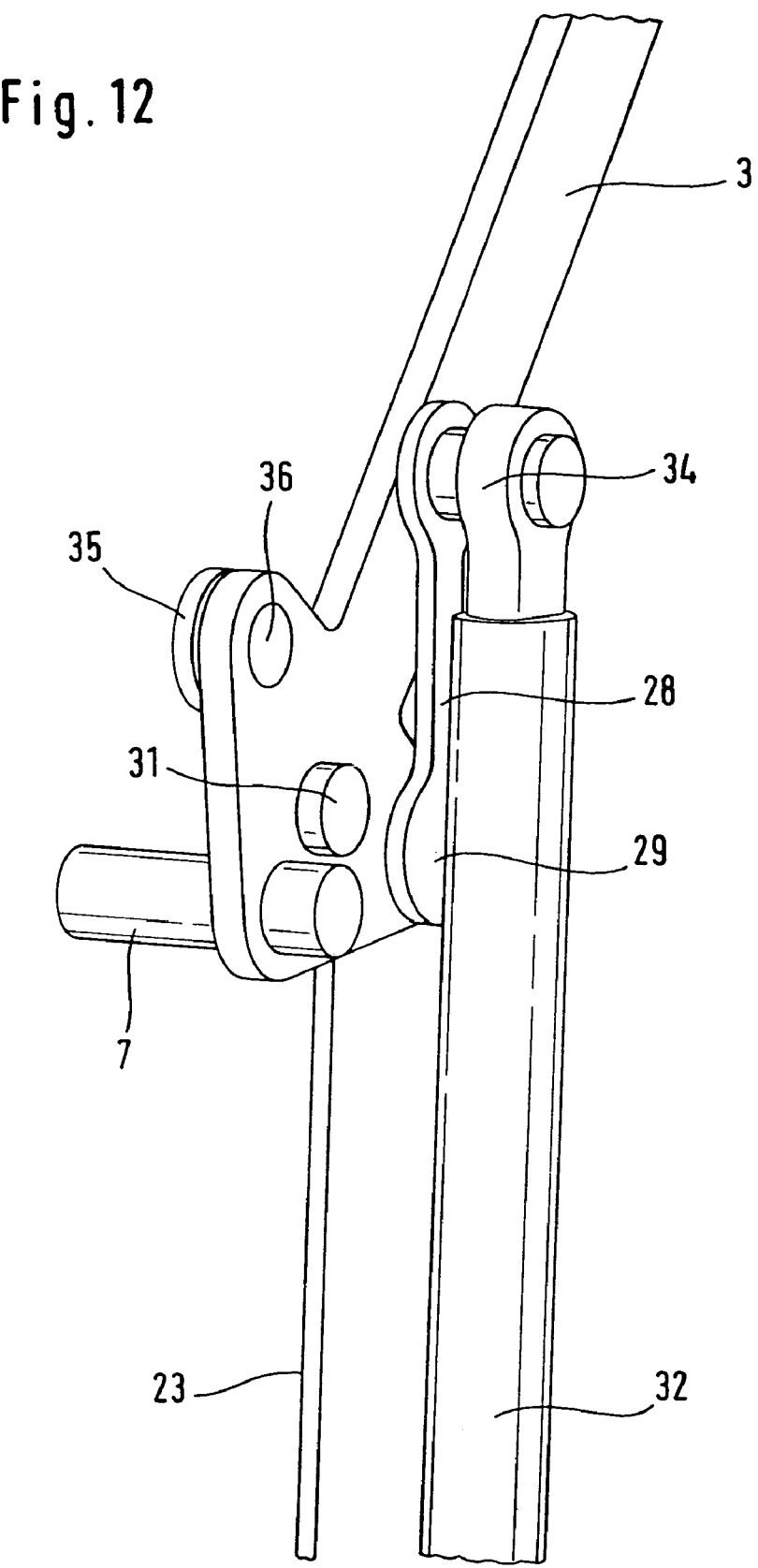
FIG. 12 is an enlarged perspective view of a detail of the lever joint arrangement according to FIG. 8 in a position between the middle opening position and the full opening position.
Figure 13:
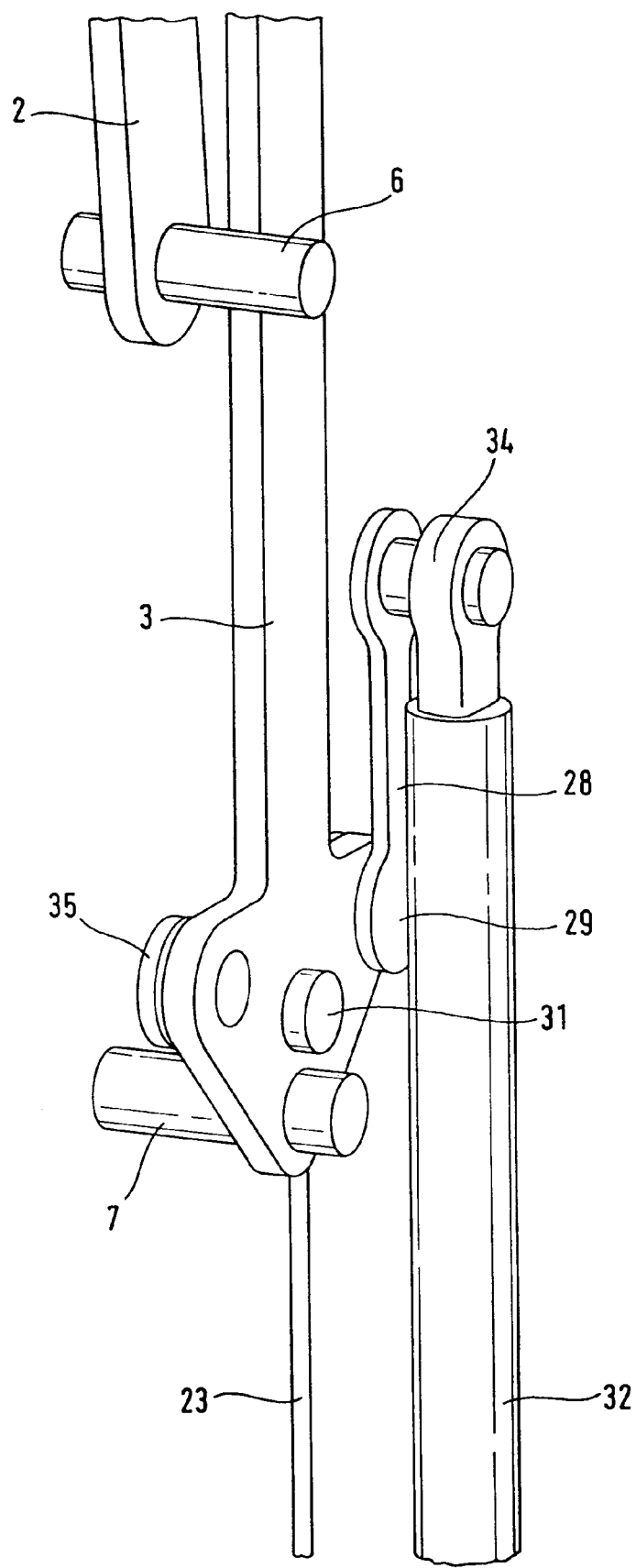
FIG. 13 is an enlarged perspective view of a detail of the lever joint arrangement according to FIG. 8 in the full opening position.

When a middle opening position, illustrated in FIG. 9, is reached beyond the position shown in FIG. 11, there is no longer any support of the first auxiliary lever 28 on the first abutment 31. Further action upon the first auxiliary lever 28 by the pneumatic spring 32 then produces tractive action upon the first auxiliary lever 28 which generates a torque about the pivot axis 7 and rotates the lever 3 further anti-clockwise, until the full opening position illustrated in FIGS. 10 and 13 is reached beyond the position shown in FIG. 12.

Figure 14:
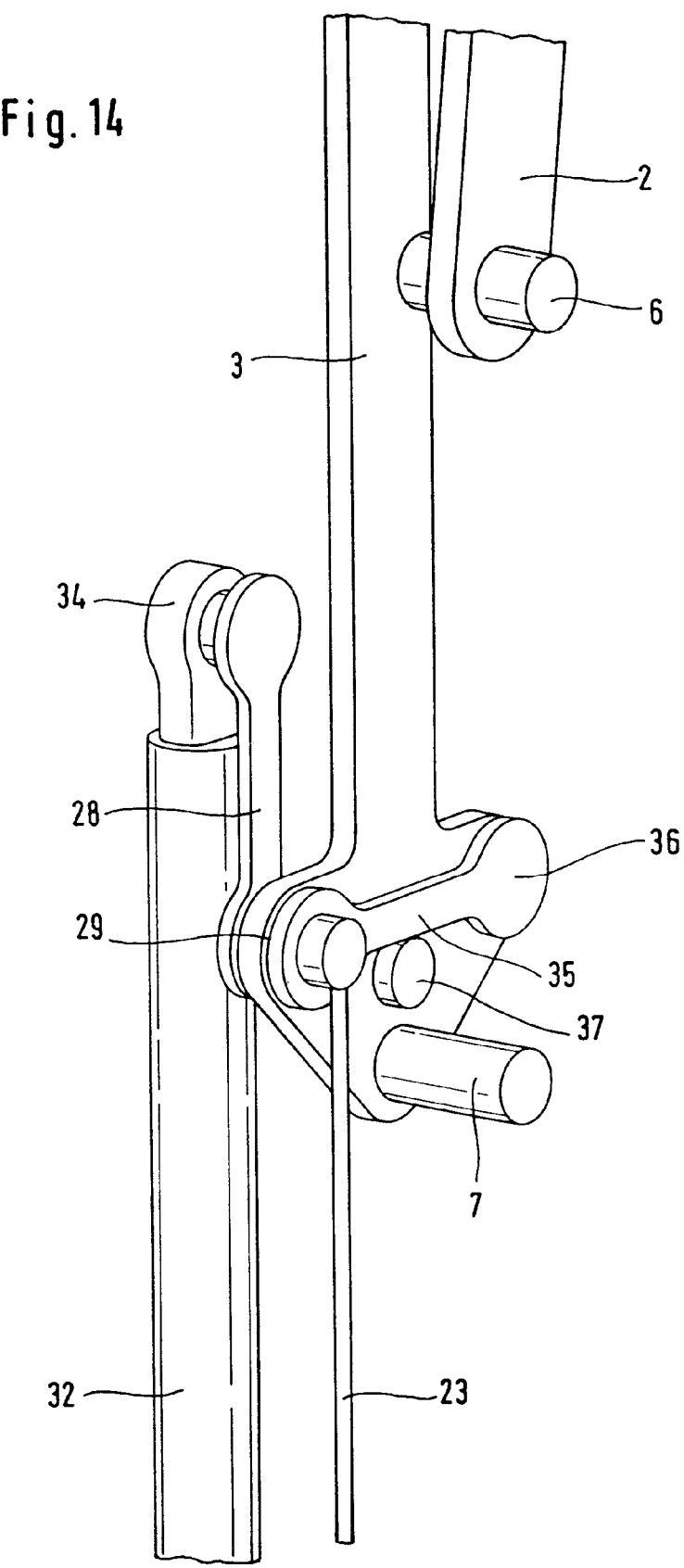
FIG. 14 is a perspective rear view of the lever joint arrangement according to FIG. 13 in the full opening position.
Figure 15:
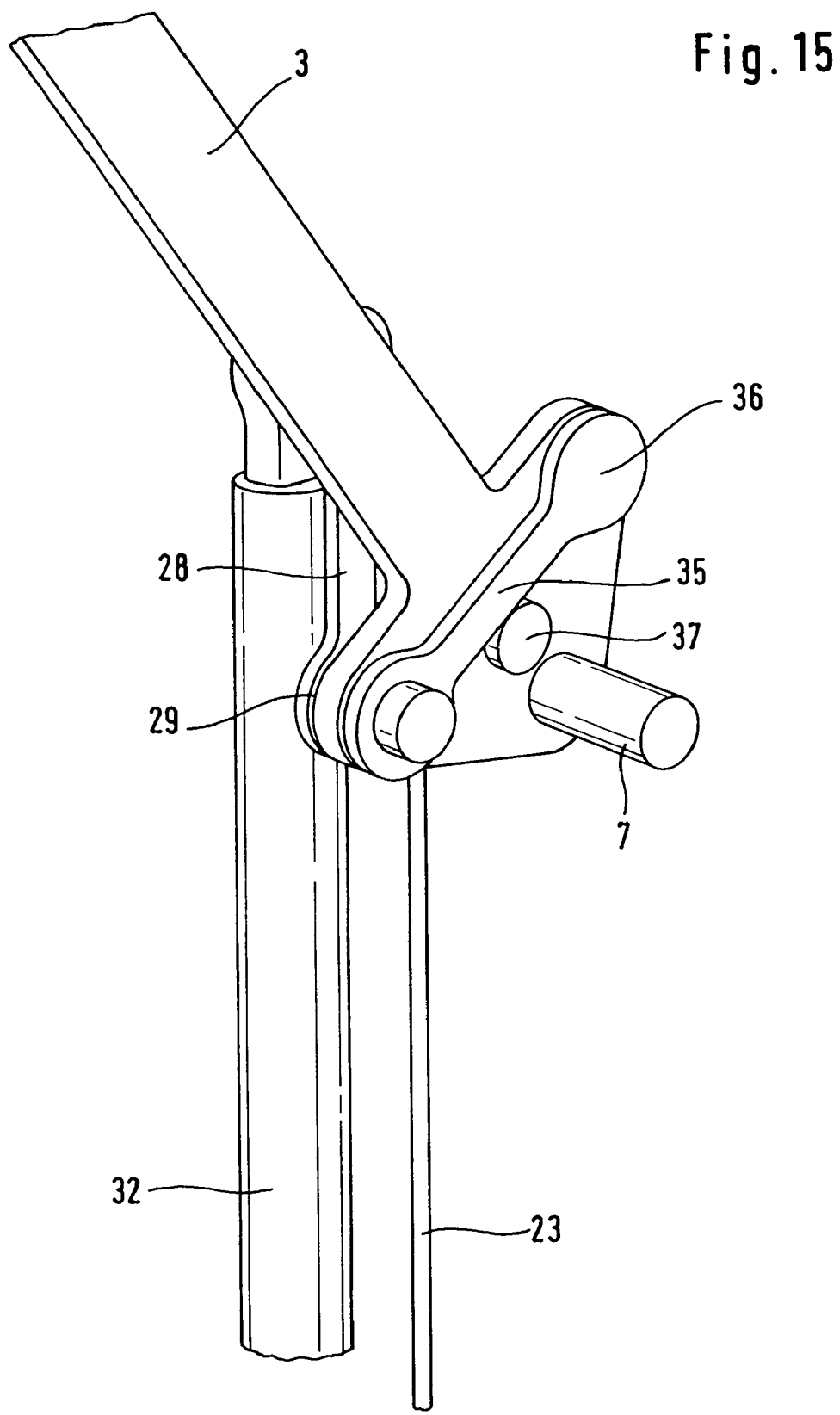
FIG. 15 is a perspective rear view of the lever joint arrangement according to FIG. 12 in the position between the middle opening position and the full opening position.
Figure 16:
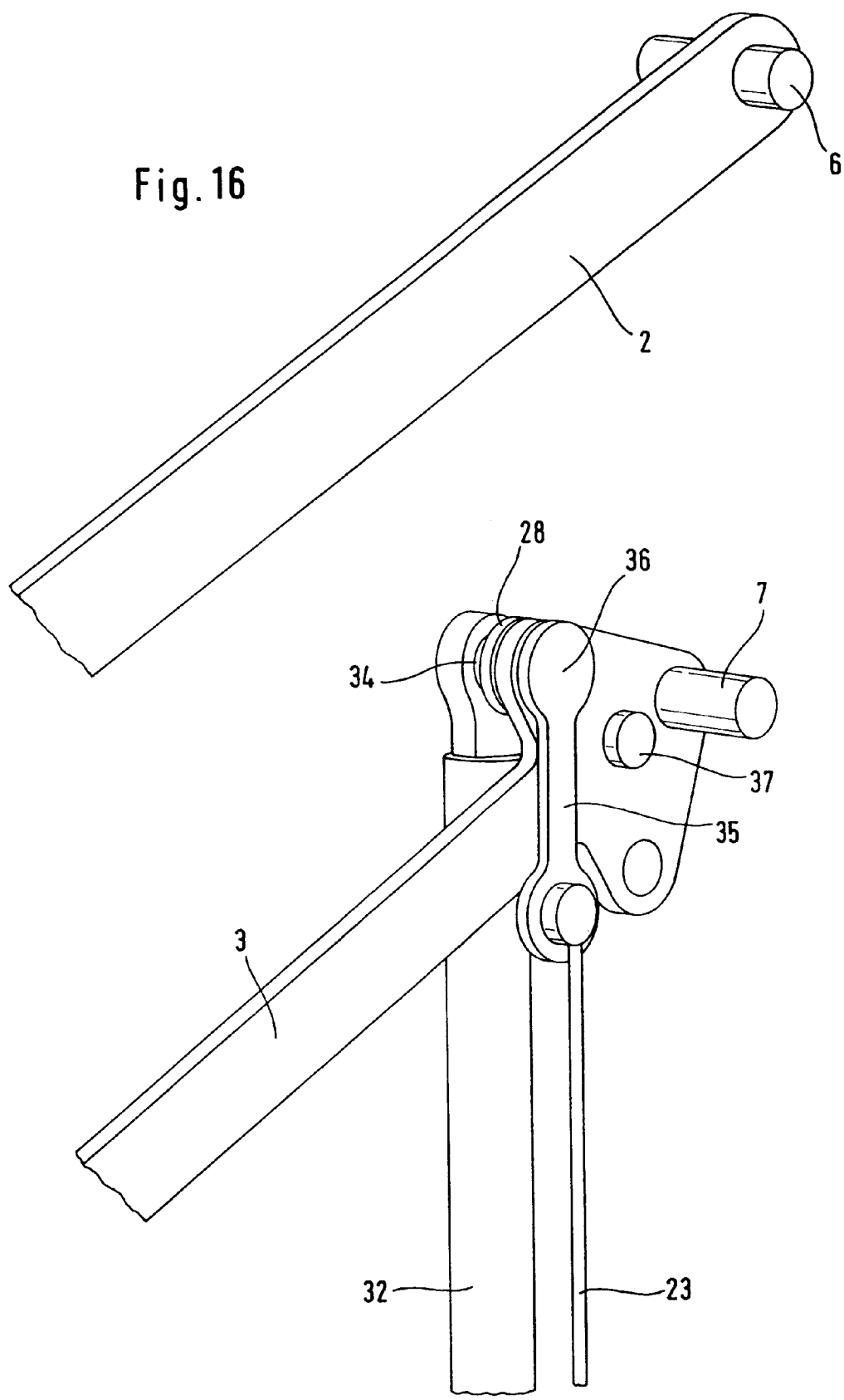
FIG. 16 is a perspective rear view of the lever joint arrangement according to FIG. 11 in the position between the middle closing position and the middle opening position.

As can be seen particularly in FIGS. 14 to 16, a second auxiliary lever 35, which corresponds approximately to the first auxiliary lever 28, is arranged on that side of the lever 3 which is located opposite the first auxiliary lever 28.

This second auxiliary lever 35 corresponds approximately to the first auxiliary lever 28 and is articulated on the lever 3 pivotably about a second joint axis 36 which extends parallel to the pivot axis 7 approximately at the same distance from the connecting line 30 as the first joint axis 28, but on the other side of the connecting line 30.

A second abutment 37 projects approximately coaxially to the first abutment 31 into the pivoting range of the second auxiliary lever 35.

Fastened to the free end of the second auxiliary lever 35 is one end of a rope 23 which extends approximately parallel to the pneumatic spring 32 and which can be driven tractively by a rope-traction drive, such as the drives illustrated, for example, in FIGS. 6 to 8.

As shown in FIG. 14, in the full opening position, the second auxiliary lever 35 bears with its middle region against the second abutment 37, so that, when the rope 23 is acted upon with traction, a torque is exerted on the second auxiliary lever 35 and, via the second joint axis 36, also on the lever 3, thus producing a pivoting of the lever 3 counter to the force of the pneumatic spring 32 beyond the position illustrated in FIG. 15 into the middle opening position. From there on, the second auxiliary lever 35 is acted upon with traction in an equivalent way to the opening operation, with the result that a torque about the pivot axis 7 is generated and the lever 3 is moved further on beyond the position illustrated in FIG. 16 into the closing position.

Figure 17:
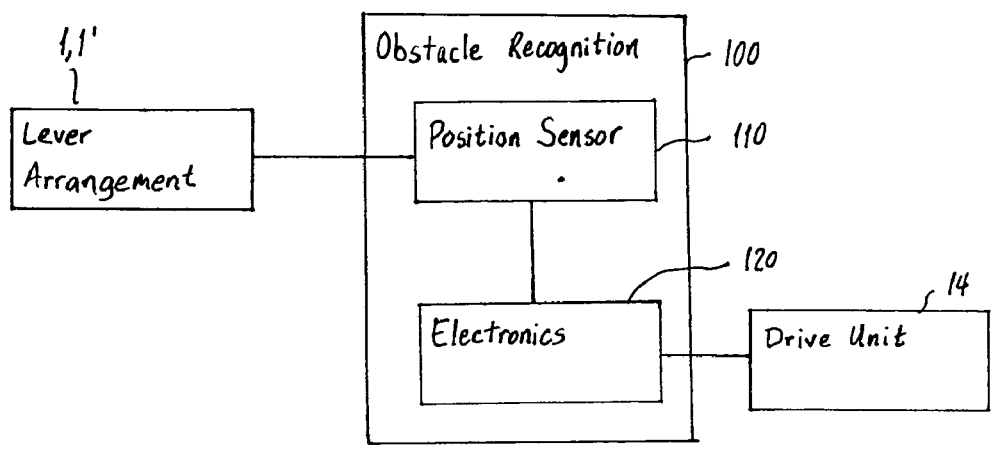
FIG. 17 is a block diagram of a obstacle recognition for the flap drive according to the present invention.

FIG. 17 shows an obstacle recognition device 100 to prevent an obstacle located in the path of movement of the flap 10 from being pinched and damaged. A position sensor 110 such as, for example, a potentiometer is used to detect a resistance obstructing a pivoting movement of the lever arrangement in one drive direction. A corresponding resistance signal can be fed to electronics 120. In response to a resistance signal, the electronics 120 may be operable for stopping the drive unit in the one drive direction.

So that an obstacle of this kind may be released again immediately, the drive unit may be changed over, so as to move over a defined distance opposite to the one drive direction, by means of the electronics 120 when a resistance signal is received.

The position sensor 110 may detect the respective position of one of the levers of the lever arrangement and generate a corresponding position signal which is fed to the electronics 120. The running time actually required to reach the respective position is compared with a defined predetermined running time for reaching the respective position in the electronics 120. When the actual running time overshoots the predetermined running time, the resistance signal is generated. The detection of the position of one of the levers of the lever arrangement may also take place indirectly, in that, for example, the position of the drive unit is detected by a sensor, such as, for example, a Hall sensor. For this purpose, the sensor may be integrated into the drive unit.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A flap drive for driving a rear flap of a motor vehicle, comprising:

first and second lever joint arrangements arranged at a distance from one another and by which the flap is movable from a closing position to an opening position and back to the closing position, each of said first and second lever joint arrangements having a first side region connectable to the flap and a second side region connectable at a fixed location on the motor vehicle or a component of the motor vehicle, said each of said first and second lever joint arrangements having one end articulated pivotably about pivot axes at said first side region and another end articulated pivotably about pivot axes at said second side region, the mutually corresponding pivot axes extending coaxially to one another, said each of said first and second lever joint arrangements comprising a driven lever articulated at an articulation point at one of said pivot axes at said second side region an articulated at another articulation point at one of said pivot axes at said first side region; and a common motive drive unit for guiding a movement transmission unit for pivotable drive of each of said driven levers of said first and second lever joint arrangements.

2. The flap drive of claim 1, wherein said driven levers of said first and second lever joint arrangements are pivotable out of the closing position into the opening position through approximately 180°.

3. The flap drive of claim 1, wherein each of said first and second lever joint arrangements are four-bar lever arrangements.

4. The flap drive of claim 3, wherein said four-bar lever arrangements are parallelogram lever arrangements.

5. The flap drive according to claim 1, wherein said motive drive unit is a rotary drive.

6. The flap drive of claim 5, further comprising a rigid drive shaft extending coaxially to one of the pivot axes of the articulation points and connected fixedly with respect to rotation to each of said driven levers of said first and second lever joint arrangements, said rotary drive being connected to said rigid drive for rotating said rigid drive.

7. The flap drive of claim 5, further comprising a rigid drive shaft extending parallel to one of the pivot axes of said articulation points, gear units connected to said rigid drive shaft, each of said gear units being connected to a corresponding of said driven levers of said first and second lever joint arrangements, said rigid drive being rotatably driven by said rotary drive, wherein said driven levers are pivotable about the pivot axis by said gear units in response to rotation of said rigid drive.

8. The flap drive of claim 7, wherein said gear units comprise one of chain gear units and toothed-belt gear units, each of said gear units comprising a driving wheel arranged fixedly on the drive shaft, a drive wheel arranged fixedly with respect to rotation on a corresponding one of said driven levers, and one of a chain and a toothed belt guided around said driving wheel and said drive wheel.

9. The flap drive of claim 5, further comprising flexible shafts rotatable drivable by said rotary drive, each of said flexible shafts extending to one of the pivot axes of said articulation points for rotatably driving said driven levers of said first and second lever joint arrangements.

10. The flap drive of claim 9, wherein each of said driven levers is connected to one of said flexible shafts by a gear unit such that each of said flexible shafts rotatably drives a corresponding one of said driven levers by said gear unit.

11. The flap drive of claim 10, wherein each of said gear units comprises one of an epicyclic gear unit and a worm gear unit.

12. The flap drive of claim 5, further comprising rope pulleys arranged coaxially to the pivot axes of said articulation points, each of said rope pulleys being connected fixedly with respect to rotation to a corresponding one of said driven levers of said first and second lever joint arrangements, wherein said motive drive unit is a rope-traction drive connected for tractively driving two ropes wound onto said rope pulleys.

13. The flap drive of claim 12, wherein said rope-traction drive comprises at least one driving rope pulley for tractively driving at least one of said ropes.

14. The flap drive of claim 13, wherein each of said two ropes is guided from the driving rope pulley to a corresponding one of said rope pulleys, each of said ropes is wound in one direction onto said driving rope pulley and wound in the opposite direction onto a corresponding one of said rope pulleys.

15. The flap drive of claim 13, further comprising a reduction gear unit arranged between said motive drive unit and said driving rope pulley such that said driving rope pulley is driven by said motive drive unit by said reduction gear unit.

16. The flap drive of claim 12, wherein said rope-traction drive comprises at least one rack connected to one of said ropes, said at least one rack being longitudinally driven by said rope-traction drive.

17. The flap drive of claim 16, wherein said rope traction drive comprises two racks, each of said racks being connected to one of said two ropes, wherein each of said ropes is tractioned from the rack and wound in the opposite direction onto said rope pulleys.

18. The flap drive of claim 16, further comprising a reduction gear unit arranged between said motive drive unit and said rack such that said rack is driven by said motive drive unit by said reduction gear unit.

19. The flap drive of claim 1, wherein a connecting line extends from said articulation point of said driven lever at said first side and said articulation point of said driven lever at said second side, each of said driven levers of said first and second lever joint arrangements comprises a first auxiliary lever having an end region articulated on said each of said each of said driven levers at a distance from said connecting line, said articulated end region of said first auxiliary lever being arranged between said articulation point of said each of said driven levers at said first side region and said articulation point of said each of said driven levers at said second side region, such that said first auxiliary lever is pivotable about a first joint axis parallel to said pivot axis of said at least one of said driven levers, a first abutment being arranged on said each of said driven levers in a region of said connecting line and projecting into a pivoting range of said first auxiliary lever such that said first auxiliary lever butts against said first abutment at a distance from said articulation point of said driven lever at said second side region, wherein the other end region of said first auxiliary lever is connectable to a first movement device at an engagement point which produces a force directed approximately in the direction of a longitudinal extension of said driven lever in one of the closing position and the opening position.

20. The flap drive of claim 19, wherein said each of said driven levers includes a second auxiliary lever having an end region articulated on said each of said driven levers at a distance from said connecting line between said articulation point of said each of said driven levers at said first side region and said articulation point of said each of said driven levers at said second side region on a side of said connecting line which is located opposite said first joint axis, such that said second auxiliary lever is pivotable about a second joint axis parallel to said pivot axes of said each of said driven levers, a second abutment being arranged on said each of said driven levers in a region of said connecting line and projecting into a pivoting range of said second auxiliary lever such that said second auxiliary lever butts against said second abutment at a distance from said articulation point of said driven lever at said second side region, wherein the other end region of said second auxiliary lever is connectable to a second movement device at an engagement point, said second movement device produces a force directed approximately in the direction of a longitudinal extension of said driven lever in the other one of said closing position and said opening position.

21. The flap drive of claim 20, wherein said first auxiliary lever and said second auxiliary lever are arranged on opposing sides of said each of said levers.

22. The flap drive of claim 21, wherein said first abutment and said second abutment are arranged approximately coaxially to one another.

23. The flap drive of claim 21, wherein said first and the second auxiliary levers are approximately of equal length.

24. The flap drive of claims 20, wherein at least one of said first and second auxiliary levers includes a middle region butting against said corresponding one of said first and second abutments, said middle region being arranged between said joint axis and the engagement point of said at least one of said first and second auxiliary levers.

25. The flap drive of claims 20, wherein said first and second movement devices comprise ropes of a rope-traction drive.

26. The flap drive of claim 20, wherein said first and second movement devices comprise pneumatic springs.

27. The flap drive of claim 1, further comprising an obstacle recognition for detecting a resistance obstructing a pivoting movement of one of said first and second lever arrangements in one drive direction and feeding a corresponding resistance signal to electronics for stopping said drive unit in the one drive direction.

28. The flap drive of claim 27, said electronics comprising means for moving the drive unit over a defined distance opposite to the one drive direction when the resistance signal is received.

29. The flap drive of claim 27, wherein said obstacle recognition includes a position sensor potentiometer for detecting a respective position of one of said first and second lever arrangements for generating a corresponding position signal fed to said electronics, said electronics comprising means for comparing the running time actually required to reach a respective position with a defined predetermined running time for reaching the respective position, and means for generating the resistance signal when the actual running time is greater than the predetermined running time.

30. The flap drive according claim 1, further comprising a coupling arranged between said motive drive unit and said levers of said first and second lever joint arrangements, said coupling being openable so that the flap is manually movable.

* * * * *